US012578460B2

(12) United States Patent
Carroll et al.

(10) Patent No.: US 12,578,460 B2
(45) Date of Patent: Mar. 17, 2026

(54) GUARD BAND ANTENNA IN A BEAM STEERING RADAR FOR RESOLUTION REFINEMENT

(71) Applicant: BDCM A2 LLC, Dover, DE (US)

(72) Inventors: Kenneth Ray Carroll, Huntington Beach, CA (US); Maha Achour, Encinitas, CA (US)

(73) Assignee: BDCM A2 LLC, Dover, DE (US)

( * ) Notice: Subject to any disclaimer, the term of this patent is extended or adjusted under 35 U.S.C. 154(b) by 273 days.

(21) Appl. No.: 17/614,196

(22) PCT Filed: Jun. 2, 2020

(86) PCT No.: PCT/US2020/035758
§ 371 (c)(1),
(2) Date: Nov. 24, 2021

(87) PCT Pub. No.: WO2020/247393
PCT Pub. Date: Dec. 10, 2020

(65) Prior Publication Data
US 2022/0252721 A1     Aug. 11, 2022

Related U.S. Application Data

(60) Provisional application No. 62/856,688, filed on Jun. 3, 2019.

(51) Int. Cl.
*G01S 13/931* (2020.01)
*G01S 13/89* (2006.01)
*G01S 13/88* (2006.01)

(52) U.S. Cl.
CPC ............ *G01S 13/931* (2013.01); *G01S 13/89* (2013.01); *G01S 2013/93271* (2020.01)

(58) Field of Classification Search
CPC ................... G01S 13/931; G01S 13/89; G01S 2013/93271; G01S 7/4008; G01S 7/4021;
(Continued)

(56) References Cited

U.S. PATENT DOCUMENTS 6,958,729 B1 * 10/2005 Metz ........................ H01Q 3/26
343/753
2006/0267830 A1 * 11/2006 O'Boyle ............... G01S 13/931
340/436
(Continued)

FOREIGN PATENT DOCUMENTS

JP       2008-530914 A     8/2008
JP       2013/250217      12/2013
(Continued)

OTHER PUBLICATIONS

Notice of Preliminary Rejection from Korean Intellectual Property Office dated Aug. 26, 2025 (8 pages) (without translation).

*Primary Examiner* — Vladimir Magloire
*Assistant Examiner* — Remash R Guyah
(74) *Attorney, Agent, or Firm* — Dinsmore & Shohl LLP

(57) ABSTRACT

Examples disclosed herein relate to a beam steering vehicle radar for object identification. The beam steering vehicle radar includes a beam steering receive antenna having a plurality of antenna elements to generate a radiation beam comprising a main lobe and a plurality of side lobes, at least one guard band antenna to generate a guard band radiation beam, and a perception module coupled to the beam steering receive antenna to detect and identify a first object reflection in the radiation beam. The perception module has a monopulse module to determine a range and angle of arrival for the first object reflection and detect multiple objects upon determining an absence of a second object reflection in the guard band radiation beam.

20 Claims, 6 Drawing Sheets

(58) Field of Classification Search
CPC ........... G01S 2013/0254; G01S 13/426; G01S 13/4463; G01S 13/584; G01S 7/35; G01S 7/2813; G01S 7/417; G01S 13/685; G01S 13/88; G01S 7/027; G01S 2013/0245; H01Q 1/3233; H01Q 3/2635; H01Q 15/0086; H01Q 3/26–3/267
USPC ............ 342/146, 149–158, 368–377, 70–72, 342/159–164
See application file for complete search history.

(56) References Cited

U.S. PATENT DOCUMENTS

| | | | |
|---|---|---|---|
| 2014/0266868 A1 | 9/2014 | Schuman | |
| 2016/0041257 A1 | 2/2016 | Holbourn | |
| 2016/0363651 A1* | 12/2016 | Lim | G01S 7/414 |
| 2018/0351250 A1 | 12/2018 | Achour et al. | |
| 2020/0355817 A1* | 11/2020 | Gillian | G01S 7/4026 |

FOREIGN PATENT DOCUMENTS

| | | |
|---|---|---|
| JP | 2014-59247 A | 4/2014 |
| JP | 2019-74527 A | 5/2019 |
| KR | 10-1461131 B1 | 11/2014 |
| KR | 10-1879404 B1 | 7/2018 |

* cited by examiner

500

502 — Object reflection received in main beam

504 — Reflection received in guard band beam?

Yes

No

506 — Initiate search for multiple objects in main beam

508 — Type Scan?

Main Lobe

Guard Lobe

510 — Objects Detected?

Yes

No

512 — Capture Object Data

GUARD BAND ANTENNA IN A BEAM STEERING RADAR FOR RESOLUTION REFINEMENT

CROSS-REFERENCE TO RELATED APPLICATIONS

This application is a U.S. national stage application under 35 U.S.C. § 371 of International Paten Application No. PCT/US2020/035758, title "Guard Band Antenna in a Beam Steering Radar for Resolution Refinement," filed on Jun. 2, 2020, which claims priority from U.S. Provisional Application No. 62/856,688, titled "Guard Monopole for Resolution Refinement," filed on Jun. 3, 2019, all of which are incorporated by reference herein in their entirety.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on. The requirements for object and image detection are critical and specify the time required to capture data, process it and turn it into action. All this while ensuring accuracy, consistency and cost optimization.

An aspect of making this work is the ability to detect and classify objects in the surrounding environment at the same or possibly at an even better level than humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

For object detection in some radar systems, signals are transmitted using a modulation enabling acquisition of information from the analog signals directly. One such system employs Frequency Modulation Continuous Waveform ("FMCW") techniques to capture range and velocity directly from the received signals. At each angle of arrival, the generated beam has a bandwidth or beam width, generally measured at the half power gain, or −3 dB. The angular resolution of the radar system is thus limited by this beam width as multiple objects therein are not easily distinguished.

BRIEF DESCRIPTION OF THE DRAWINGS

The present application may be more fully appreciated in connection with the following detailed description taken in conjunction with the accompanying drawings, which are not drawn to scale, in which like reference characters refer to like parts throughout, and in which.

DETAILED DESCRIPTION

Figure 1:
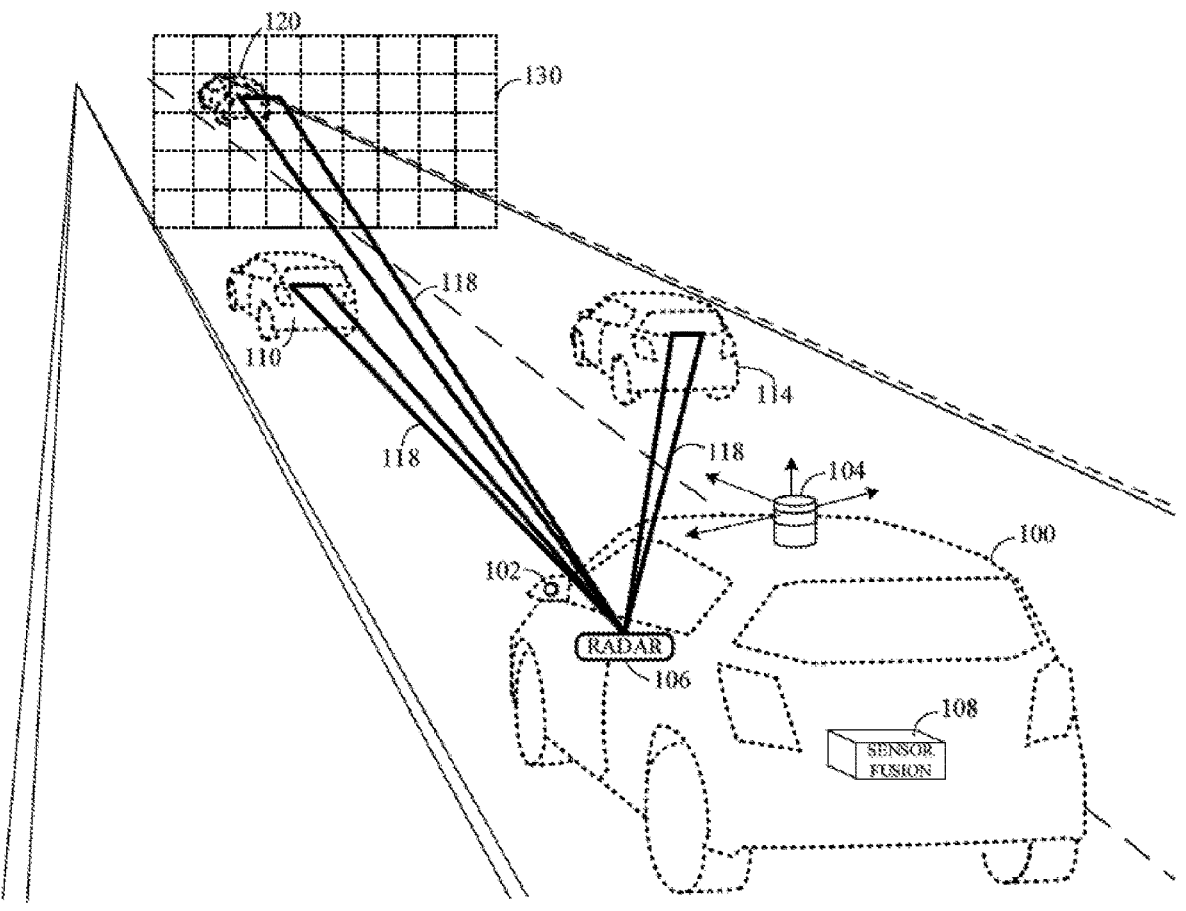
FIG. 1 illustrates an example environment in which a beam steering radar in an autonomous vehicle is used to detect and identify objects, according to various implementations of the subject technology.

The present disclosure provides methods and apparatuses to refine angular resolution of an object detection system, and specifically of a radar system using a guard band antenna to effectively identify and resolve multiple objects. The radar disclosed herein is a beam steering radar capable of generating narrow, directed beams that can be steered to any angle (i.e., from 0° to 360°) across a Field of View ("FoV") to detect objects. The beams are generated and steered in the analog domain, while processing of received radar signals for object identification is performed with advanced signal processing and machine learning techniques. In various implementations, objects are detected in a received radar signal with the help of one or more guard band antennas to effectively resolve multiple objects inside a main beam with a high degree of accuracy and angular resolution. Radar angular resolution, as generally described herein, is the minimum distance between two equally large objects at the same range which the radar is able to distinguish and separate from each other.

A guard band antenna, as generally described herein, is an antenna that accompanies an array antenna (such as a receive array antenna) to resolve objects detected in a main beam. Examples of the present disclosure apply at least one guard band antenna to generate a series of guard beams. These have 3 dB beam widths less than that of the main beam. Multiple objects are indicated when an object is detected in the main beam but not in the guard beam. In response, the system may choose to apply a different steering angle or smaller scan step to the guard band antenna, the main beam or both. Doing so will effectively improve the angular resolution of the radar system as it is able to resolve multiple objects within a main beam.

It is to be understood that for transmission of a signal, propagation flows from signal source through a phase shifter which adjusts the phase of one or more radiating elements in an antenna array to direct a radiation beam. The waveform of the transmitted signal may be described as:

$$s(t) = A \cdot \sin[2\pi f(t) \cdot t + \varphi(t)]$$

wherein A is the amplitude modulation, a variation of the amplitude as a function of time, t, f is the frequency of the signal, and $\varphi$ is the phase of the signal. A variety of applications and configurations are possible. In a radar system, specifically, a receive antenna responds to reflections or echoes of signals from objects in the environment. The received signals are compared to the transmitted signal to identify a range and velocity of the objects. For objects at the same range and velocity, the received signals may create a false impression and indicate a single object at an intermediate location.

In operation, the receive antenna elements scan an area with a radiation beam having a main lobe and side lobes. Information regarding objects is obtained from the main lobe, and the side lobes are removed or ignored. One technique to remove, or identify, the side lobes of the radiation beam is to use a guard band antenna. A guard band antenna generates a radiation pattern separate from the main beam and is effective to eliminate side-lobe returns from objects. The goal is for the guard band antenna to provide a gain that is higher than the side lobes and therefore enable their elimination. The guard band antenna effectively acts as a filter.

It is appreciated that the detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

FIG. 1 illustrates an example environment in which a beam steering radar in an autonomous vehicle is used to detect and identify objects, according to various implementations of the subject technology. Ego vehicle 100 is an autonomous vehicle with a beam steering radar system 106 for transmitting a radar signal to scan a FoV or specific area. As described in more detail below, the radar signal is transmitted according to a set of scan parameters that can be adjusted to result in multiple transmission beams 118. The scan parameters may include, among others, the total angle of the scanned area defining the FoV, the beam width or the scan angle of each incremental transmission beam, the number of chirps in the radar signal, the chirp time, the chirp segment time, the chirp slope, and so on. The entire FoV or a portion of it can be scanned by a compilation of such transmission beams 118, which may be in successive adjacent scan positions or in a specific or random order. Note that the term FoV is used herein in reference to the radar transmissions and does not imply an optical FoV with unobstructed views. The scan parameters may also indicate the time interval between these incremental transmission beams, as well as start and stop angle positions for a full or partial scan.

In various examples, the ego vehicle 100 may also have other perception sensors, such as a camera 102 and a lidar 104. These perception sensors are not required for the ego vehicle 100 but may be useful in augmenting the object detection capabilities of the beam steering radar 106. The camera 102 may be used to detect visible objects and conditions and to assist in the performance of various functions. The lidar 104 can also be used to detect objects and provide this information to adjust control of the ego vehicle 100. This information may include information such as congestion on a highway, road conditions, and other conditions that would impact the sensors, actions or operations of the vehicle. Existing ADAS modules utilize camera sensors to assist drivers in driving functions such as parking (e.g., in rear view cameras). Cameras can capture texture, color and contrast information at a high level of detail, but similar to the human eye, they are susceptible to adverse weather conditions and variations in lighting. The camera 102 may have a high resolution but may not resolve objects beyond 50 meters.

Lidar sensors typically measure the distance to an object by calculating the time taken by a pulse of light to travel to an object and back to the sensor. When positioned on top of a vehicle, a lidar sensor can provide a 360° 3D view of the surrounding environment. Other approaches may use several lidars at different locations around the vehicle to provide the full 360° view. However, lidar sensors such as lidar 104 are still prohibitively expensive, bulky in size, sensitive to weather conditions and are limited to short ranges (e.g., less than 150-300 meters). Radars, on the other hand, have been used in vehicles for many years and operate in all-weather conditions. Radar sensors also use far less processing than the other types of sensors and have the advantage of detecting objects behind obstacles and determining the speed of moving objects. When it comes to resolution, the laser beams emitted by the lidar 104 are focused on small areas, have a smaller wavelength than RF signals, and can achieve around 0.25 degrees of resolution.

In various examples and as described in more detail below, the beam steering radar 106 can provide a 360° true 3D vision and human-like interpretation of the path and surrounding environment of the ego vehicle 100. The beam steering radar 106 is capable of shaping and steering RF beams in all directions in a 360° FoV with at least one beam steering antenna and recognize objects quickly and with a high degree of accuracy over a long range of around 300 meters or more. The short-range capabilities of the camera 102 and the lidar 104 along with the long-range capabilities of the radar 106 enable a sensor fusion module 108 in the ego vehicle 100 to enhance its object detection and identification.

As illustrated, the beam steering radar 106 can detect both vehicle 120 at a far range (e.g., greater than 350 m) as well as vehicles 110 and 114 at a short range (e.g., lesser than 100 m). Detecting both vehicles in a short amount of time and with enough range and velocity resolution is imperative for full autonomy of driving functions of the ego vehicle. The radar 106 has an adjustable Long-Range Radar ("LRR") mode that enables the detection of long-range objects in a very short time to then focus on obtaining finer velocity resolution for the detected vehicles. Although not described herein, radar 106 is capable of time-alternatively reconfiguring between LRR and Short-Range Radar ("SRR") modes. The SRR mode enables a wide beam with lower gain but can make quick decisions to avoid an accident, assist in parking and downtown travel, and capture information about a broad area of the environment. The LRR mode enables a narrow, directed beam and long distance, having high gain; this is powerful for high speed applications, and where longer processing time allows for greater reliability. Excessive dwell time for each beam position may cause blind zones, and the adjustable LRR mode ensures that fast object detection can occur at long range while maintaining the antenna gain, transmit power and desired Signal-to-Noise Ratio ("SNR") for the radar operation.

Figure 2:
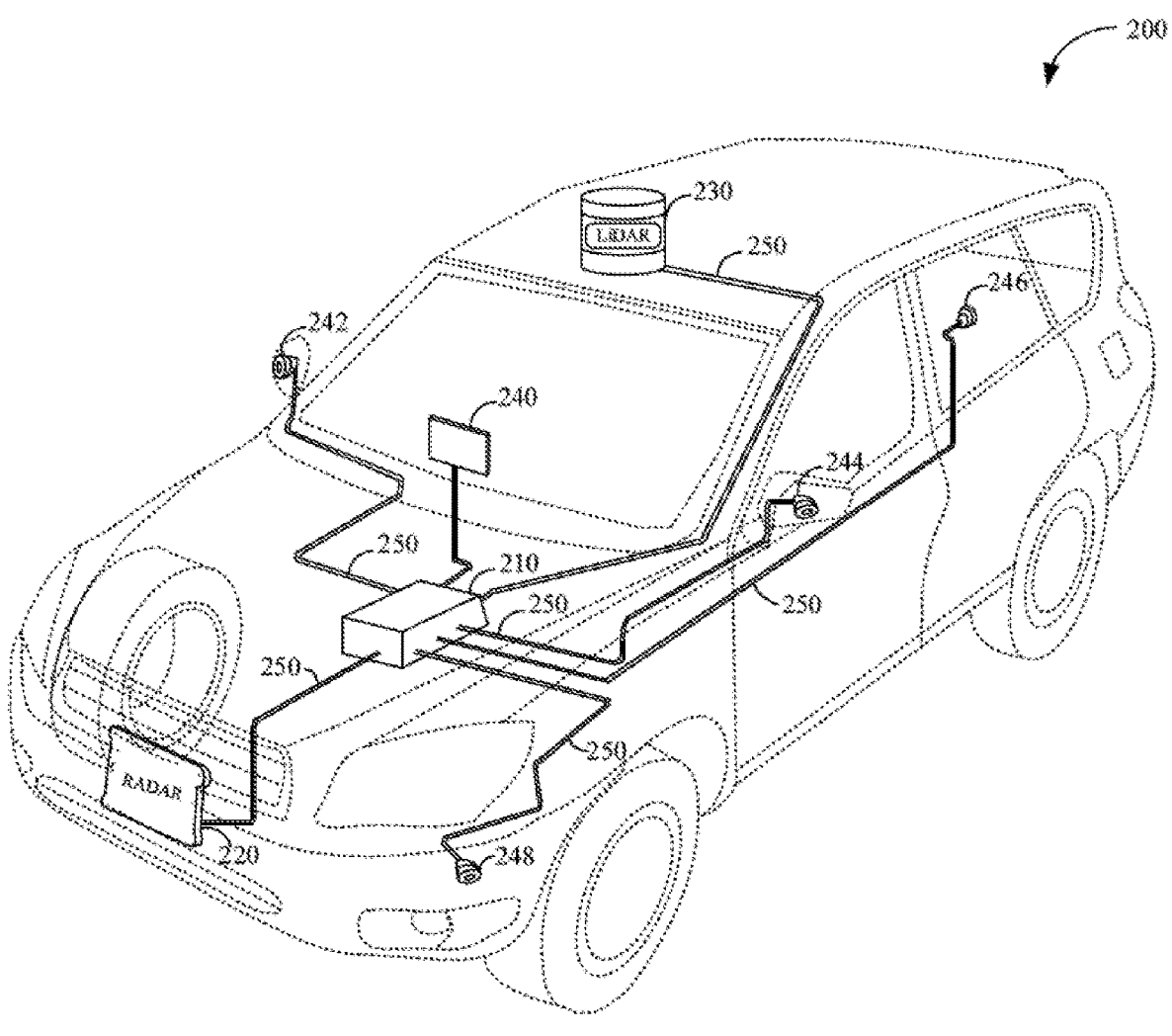
FIG. 2 illustrates an example network environment in which a radar system may be implemented in accordance with one or more implementations of the subject technology.

Attention is now directed to FIG. 2, which illustrates an example network environment 200 in which a radar system may be implemented in accordance with one or more implementations of the subject technology. The example network environment 200 includes a number of electronic devices 220, 230, 240, 242, 244, 246, and 248 that are coupled to an electronic device 210 via the transmission lines 250. The electronic device 210 may communicably couple the electronic devices 242, 244, 246, 248 to one another. In one or more implementations, one or more of the electronic devices 242, 244, 246, 248 are communicatively coupled directly to one another, such as without the support of the electronic device 210. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

In some implementations, one or more of the transmission lines 250 are Ethernet transmission lines. In this respect, the electronic devices 220, 230, 240, 242, 244, 246, 248 and 210 may implement a physical layer ("PHY") that is interoperable with one or more aspects of one or more physical layer specifications, such as those described in the Institute of Electrical and Electronics Engineers ("IEEE") 802.3 Standards (e.g., 802.3ch). The electronic device 210 may include a switch device, a routing device, a hub device, or generally any device that may communicably couple the electronic devices 220, 230, 240, 242, 244, 246, and 248.

In one or more implementations, at least a portion of the example network environment 200 is implemented within a vehicle, such as a passenger car. For example, the electronic devices 242, 244, 246, 248 may include, or may be coupled to, various systems within a vehicle, such as a powertrain system, a chassis system, a telematics system, an entertainment system, a camera system, a sensor system, such as a lane departure system, a diagnostics system, or generally any system that may be used in a vehicle. In FIG. 2, the electronic device 210 is depicted as a central processing unit, the electronic device 220 is depicted as a radar system, the electronic device 230 is depicted as a lidar system having one or more lidar sensors, the electronic device 240 is depicted as an entertainment interface unit, and the electronic devices 242, 244, 246, 248 are depicted as camera devices, such as forward-view, rear-view and side-view cameras. In one or more implementations, the electronic device 210 and/or one or more of the electronic devices 242, 244, 246, 248 may be communicatively coupled to a public communication network, such as the Internet.

The electronic device 210 includes a multi-sensor fusion platform for processing data acquired by electronic devices 220, 230, 240, 242, 244, 246, and 248, including labeling objects detected and identified in the acquired data. Such objects may include structural elements in the environment near the vehicle such as roads, walls, buildings, road center medians and other objects, as well as other vehicles, pedestrians, bystanders, cyclists, plants, trees, animals and so on.

Figure 3:
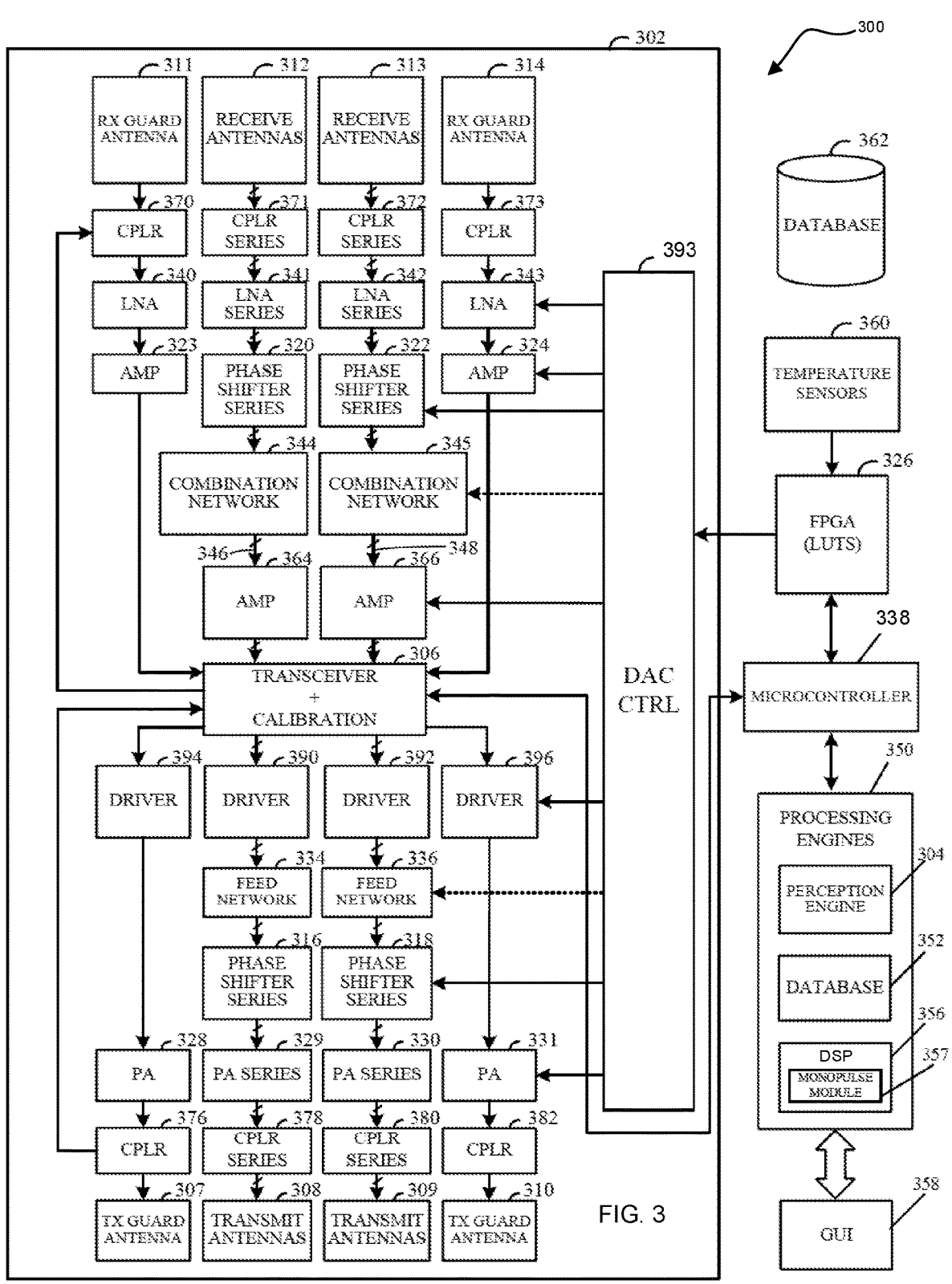
FIG. 3 illustrates a schematic diagram of a beam steering radar system as in FIG. 2 and in accordance with one or more implementations of the subject technology.

FIG. 3 illustrates a schematic diagram of a beam steering radar system implemented as in FIG. 2 in accordance with various examples. Beam steering radar 300 is a "digital eye" with true 3D vision and capable of a human-like interpretation of the world. The "digital eye" and human-like interpretation capabilities are provided by two main modules: radar module 302 and a perception engine 304. Radar module 302 is capable of both transmitting RF signals within a FoV and receiving the reflections of the transmitted signals as they reflect off of objects in the FoV. With the use of analog beam steering in radar module 302, a single transmit and receive chain can be used effectively to form directional, as well as steerable, beams.

The receive chain includes receive antennas 312-313, receive guard band or simply guard antennas 311 and 314, optional couplers 370-373, Low Noise Amplifiers ("LNAs") 340-343, Phase Shifter (PS") circuits 320-322, amplifiers (such as Power Amplifiers ("PAs")) 323-324 and 364-366, and combination networks 344-345. The transmit chain includes drivers 390-396, feed networks 334-336, PS circuits 316-318, PAs 328-331, optional couplers 376-382, transmit antennas 308-309, and optional transmit guard antennas 307 and 310. The radar module 302 also includes a transceiver 306, a Digital-to-Analog ("DAC)" controller 393, a Field-Programmable Gate Array ("FPGA") 326, a microcontroller 328, processing engines 350, a Graphic User Interface ("GUI") 358, temperature sensors 360 and a database 362. The processing engines 350 includes perception engine 304, database 352 and Digital Signal Processing ("DSP") module 356 having a monopulse module 357. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

In operation, the transceiver 306 in radar module 302 generates signals for transmission through the series of transmit antennas 308-309 and manages signals received through the series of receive antennas 312-313. Beam steering within the FoV is implemented with PS circuits 316-318 coupled to the transmit antennas 308-309, respectively, on the transmit chain and PS circuits 320-322 coupled to the receive antennas 312-313, respectively, on the receive chain. Careful phase and amplitude calibration of the transmit antennas 308-309 and receive antennas 312-313 can be performed in real-time with the use of couplers integrated into the radar module 302 as described in more detail below. In other implementations, calibration is performed before the radar is deployed in an ego vehicle and the couplers may be removed.

The use of PS circuits 316-318 and 320-322 enables separate control of the phase of each element in the transmit antennas 308-309 and receive antennas 312-313. Unlike early passive architectures, the beam is steerable not only to discrete angles but to any angle (i.e., from 0° to 360°) within the FoV using active beamforming antennas. A multiple element antenna can be used with an analog beamforming architecture where the individual antenna elements may be combined or divided at the port of the single transmit or receive chain without additional hardware components or individual digital processing for each antenna element. Further, the flexibility of multiple element antennas allows narrow beam width for transmit and receive. The antenna beam width decreases with an increase in the number of antenna elements. A narrow beam improves the directivity of the antenna and provides the radar system 300 with a significantly longer detection range.

The major challenge with implementing analog beam steering is to design PSs to operate at 77 GHz. PS circuits 316-318 and 320-322 solve this problem with a reflective PS design implemented with a distributed varactor network fabricated using suitable semiconductor materials, such as Gallium-Arsenide (GaAs) materials, among others. Each PS circuit 316-318 and 320-322 has a series of PSs, with each PS coupled to an antenna element to generate a phase shift value of anywhere from 0° to 360° for signals transmitted or received by the antenna element. The PS design is scalable in future implementations to other semiconductor materials, such as Silicon-Germanium (SiGe) and CMOS, bringing down the PS cost to meet specific demands of customer applications. Each PS circuit 316-318 and 320-322 is controlled by an FPGA 326, which provides a series of voltages to the PSs in each PS circuit that results in a series of phase shifts. As described in more detail below, the FPGA 326 applies amplitude weighting in the time domain to the PSs in each of the PS circuits 316-318 and/or 320-322. The amplitude weighting lowers the side lobes of the transmit and/or the receive antennas.

The DAC controller 393 is coupled to each of the LNAs 340-343, the amplifiers 323-324 and 364-366, PS circuits 316-318 and 320-322, the drivers 390-396, and the PAs 328-331. In some aspects, the DAC controller 393 is coupled to the FPGA 326, and the FPGA 326 can drive digital signaling to the DAC controller 393 to provide analog signaling to the LNAs 340-343, the amplifiers 323-324 and 364-366, PS circuits 316-318 and 320-322, the drivers 390-396, and the PAs 328-331. In some implementations, the DAC controller 393 is coupled to the combination networks 344-345 and to the feed networks 334-336.

In various examples, an analog control signal is applied to each PS in the PS circuits 316-318 and 320-322 by the DAC controller 393 to generate a given phase shift and provide beam steering. The analog control signals applied to the PSs in PS circuits 316-318 and 320-322 are based on voltage values that are stored in Look-up Tables ("LUTs") in the FPGA 326. These LUTs are generated by an antenna calibration process that determines which voltages to apply to each PS to generate a given phase shift under each operating condition. Note that the PSs in PS circuits 316-318 and 320-322 can generate phase shifts at a very high resolution of less than one degree. This enhanced control over the phase allows the transmit and receive antennas in radar module 302 to steer beams with a very small step size, improving the capability of the radar system 300 to resolve closely located targets at very small angular resolution, e.g., <1.3°. FPGA 326 also has LUTs to store bias voltage values for the LNAs 340-343. As described in more detail below, these bias voltage values can be determined during calibration to control the gain of the LNAs, including to vary the gain of LNAs connected to edge antenna elements of the receive antennas 312-313 in order to lower the side lobe levels of the received beams.

In various examples, each of the transmit antennas 308-309 and the receive antennas 312-313 may be a meta-structure antenna, a phase array antenna, or any other antenna capable of radiating RF signals in millimeter wave frequencies. A meta-structure, as generally defined herein, is an engineered structure capable of controlling and manipulating incident radiation at a desired direction based on its geometry. Various configurations, shapes, designs and dimensions of the transmit antennas 308-309 and the receive antennas 312-313 may be used to implement specific designs and meet specific constraints.

The transmit chain in the radar module 302 starts with the transceiver 306 generating RF signals to prepare for transmission over-the-air by the transmit antennas 308-309. The RF signals may be, for example, Frequency-Modulated Continuous Wave ("FMCW") signals or chirps. An FMCW signal enables the radar system 300 to determine both the range to an object and the object's velocity by measuring the differences in phase or frequency between the transmitted signals and the received/reflected signals or echoes. Within FMCW formats, there are a variety of waveform patterns that may be used, including sinusoidal, triangular, sawtooth, rectangular and so forth, each having advantages and purposes.

Once the FMCW signals are generated by the transceiver 306, the FMCW signals are fed to drivers 390-392. From the drivers 390-392, the signals are divided and distributed through feed networks 334-336, respectively, which form a power divider system to divide an input signal into multiple signals, one for each element of the transmit antennas 308-309, respectively. The feed networks 334-336 may divide the signals so power is equally distributed among them or alternatively, so power is distributed according to another scheme, in which the divided signals do not all receive the same power. Each signal from the feed networks 334-336 is then input to the PS circuits 316-318, respectively, where the FMCW signals are phase shifted based on control signaling from the DAC controller 393 (corresponding to voltages generated by the FPGA 326 under the direction of microcontroller 328), and then transmitted to the PAs 329-330. Signal amplification is needed for the FMCW signals to reach the long ranges desired for object detection, as the signals attenuate as they radiate by the transmit antennas 308-309. From the PAs 329-330, the FMCW signals are optionally fed to couplers 378-380, respectively, to generate calibration signaling that is fed back to the transceiver 306. From the couplers 378-380, the FMCW signals are transmitted through transmit antennas 308-309. Note that couplers 378-380 are used only for real-time calibration purposes and are therefore optional. Note also that, in some aspects, the transceiver 306 feeds the FMCW signals to drivers 394-396, which are then fed to PAs 328 and 331 and to the couplers 376 and 382. From these couplers, the FMCW signals are fed to optional transmit guard antennas 307 and 310 for side lobe cancelation of the transmission signal.

The microcontroller 328 determines which phase shifts to apply to the PSs in PS circuits 316-318 and 320-322 according to a desired scanning mode based on road and environmental scenarios. Microcontroller 328 also determines the scan parameters for the transceiver to apply at its next scan. The scan parameters may be determined at the direction of one of the processing engines 350, such as at the direction of perception engine 304. Depending on the objects detected, the perception engine 304 may instruct the microcontroller 328 to adjust the scan parameters at a next scan to focus on a given area of the FoV or to steer the beams to a different direction.

In various examples and as described in more detail below, radar system 300 operates in one of various modes, including a full scanning mode and a selective scanning mode, among others. In a full scanning mode, the transmit antennas 308-309 and the receive antennas 312-313 can scan a complete FoV with small incremental steps. Even though the FoV may be limited by system parameters due to increased side lobes as a function of the steering angle, radar system 300 is able to detect objects over a significant area for a long-range radar. The range of angles to be scanned on either side of boresight as well as the step size between steering angles/phase shifts can be dynamically varied based on the driving environment. To improve performance of an autonomous vehicle (e.g., an ego vehicle) driving through an urban environment, the scan range can be increased to keep monitoring the intersections and curbs to detect vehicles, pedestrians or bicyclists. This wide scan range may deteriorate the frame rate (revisit rate) but is considered acceptable as the urban environment generally involves low velocity driving scenarios. For a high-speed freeway scenario, where the frame rate is critical, a higher frame rate can be maintained by reducing the scan range. In this case, a few degrees of beam scanning on either side of the boresight would suffice for long-range target detection and tracking.

In a selective scanning mode, the radar system 300 scans around an area of interest by steering to a desired angle and then scanning around that angle. This ensures the radar system 300 is to detect objects in the area of interest without wasting any processing or scanning cycles illuminating areas with no valid objects. Since the radar system 300 can detect objects at a long distance, e.g., 300 m or more at boresight, if there is a curve in a road, direct measures do not provide helpful information. Rather, the radar system 300 steers along the curvature of the road and aligns its beams towards the area of interest. In various examples, the selective scanning mode may be implemented by changing the chirp slope of the FMCW signals generated by the transceiver 306 and by shifting the phase of the transmitted signals to the steering angles needed to cover the curvature of the road.

Objects are detected with radar system 300 by reflections or echoes that are received at the receive antennas 312-313. The received signaling is then optionally fed to couplers 371-372 using feedback calibration signaling from the transceiver 306. The couplers 371-372 can allow probing to the receive chain signal path during real-time calibration. From the couplers 371-372, the received signaling is fed to LNAs 341-342. The LNAs 341-342 are positioned between the receive antennas 312-313 and PS circuits 320-322, which include PSs similar to the PSs in PS circuits 316-318. For receive operation, PS circuits 320-322 create phase differentials between radiating elements in the receive antennas 312-313 to compensate for the time delay of received signals between radiating elements due to spatial configurations.

Receive phase-shifting, also referred to as analog beamforming, combines the received signals for aligning echoes to identify the location, or position of a detected object. That is, phase shifting aligns the received signals that arrive at different times at each of the radiating elements in receive antennas 312-313. Similar to PS circuits 316-318 on the transmit chain, PS circuits 320-322 are controlled by the DAC controller 390, which provides control signaling to each PS to generate the desired phase shift. In various implementations, the FPGA 326 provides bias voltages to the DAC controller 390 to generate the control signaling to PS circuits 320-322.

The receive chain combines the signals fed by the PS circuits 320-322 at the combination networks 344-345, respectively, from which the combined signals propagate to the amplifiers 364-366 for signal amplification. The amplified signal is then fed to the transceiver 306 for receiver processing. Note that as illustrated, the combination networks 344-345 can generate multiple combined signals 346-348, of which each signal combines signals from a number of elements in the receive antennas 312-313, respectively. In one example, the receive antennas 312-313 include 128 and 64 radiating elements partitioned into two 64-element and 32-element clusters, respectively. For example, the signaling fed from each cluster is combined in a corresponding combination network (e.g., 344, 345) and delivered to the transceiver 306 in a separate RF transmission line. In this respect, each of the combined signals 346-348 can carry two RF signals to the transceiver 306, where each RF signal combines signaling from the 64-element and 32-element clusters of the receive antennas 312-313. Other examples may include 8, 26, 34, or 62 elements, and so on, depending on the desired configuration. The higher the number of antenna elements, the narrower the beam width. In some aspects, the receive guard antennas 311 and 314 feed the receiving signaling to couplers 370 and 373, respectively, which are then fed to LNAs 340 and 343. The filtered signals from the LNAs 340 and 343 are fed to amplifiers 323 and 324, respectively, which are then fed to the transceiver 306 for side lobe cancelation of the received signals by the receiver processing.

In various implementations, the radar module 302 includes receive guard band antennas 311 and 314 that generate a radiation pattern separate from the main beams received by the 64-element receive antennas 312-313. The receive guard band antennas 311 and 314 are implemented to effectively eliminate side-lobe returns from objects and to improve the angular resolution of detected objects, as described in more detail below. Similar, the radar module 302 may optionally include transmit guard antennas 307 and 310 to eliminate side lobe formation or reduce the gain generated by transmitter side lobes at the time of a transmitter main beam formation by the transmit antennas 308-309.

Once the received signals are received by transceiver 306, the received signals are processed by processing engines 350. Processing engines 350 include perception engine 304 that detects and identifies objects in the received signal with one or more neural networks using machine learning or computer vision techniques, database 352 to store historical and other information for radar system 300, and the DSP module 354 with an ADC module to convert the analog signals from transceiver 306 into digital signals that can be processed by monopulse module 357 to determine angles of arrival and other valuable information for the detection and identification of objects by perception engine 304. In one or more implementations, DSP engine 356 may be integrated with the microcontroller 328 or the transceiver 306.

Radar system 300 also includes a GUI 358 to enable configuration of scan parameters such as the total angle of the scanned area defining the FoV, the beam width or the scan angle of each incremental transmission beam, the number of chirps in the radar signal, the chirp time, the chirp slope, the chirp segment time, and so on as desired. In addition, radar system 300 has a temperature sensor 360 for sensing the temperature around the vehicle so that the proper voltages from FPGA 326 may be used to generate the desired phase shifts. The voltages stored in FPGA 326 are determined during calibration of the antennas under different operating conditions, including temperature conditions. A database 362 may also be used in radar system 300 to store radar and other useful data.

The radar data may be organized in sets of Range-Doppler (RD) map information, corresponding to four-dimensional (4D) information that is determined by each RF beam reflected from targets, such as azimuthal angles, elevation angles, range, and velocity. The RD maps may be extracted from FMCW radar signals and may contain both noise and systematic artifacts from Fourier analysis of the radar signals. The perception engine 304 controls further operation of the transmit antennas 308-309 by, for example, providing an antenna control signal containing beam parameters for the next RF beams to be radiated from the transmit antennas 308-309.

In operation, the microcontroller 328 may, for example, determine the parameters at the direction of perception engine 304, which may at any given time determine to focus on a specific area of a FoV upon identifying targets of interest in the ego vehicle's path or surrounding environment. The microcontroller 328 determines the direction, power, and other parameters of the RF beams and controls the transmit antennas 308-309 to achieve beam steering in various directions. Next, the transmit antennas 308-309 radiate RF beams having the determined parameters. The RF beams are reflected from targets in and around the ego vehicle's path (e.g., in a 360° field of view) and are received by the transceiver 306. The receive antennas 312-313 send the received 4D radar data to the perception engine 304 for target identification.

In various examples, the perception engine 304 can store information that describes an FoV. This information may be historical data used to track trends and anticipate behaviors and traffic conditions or may be instantaneous or real-time data that describes the FoV at a moment in time or over a window in time. The ability to store this data enables the perception engine 304 to make decisions that are strategically targeted at a particular point or area within the FoV. For example, the FoV may be clear (e.g., no echoes received) for a period of time (e.g., five minutes), and then one echo arrives from a specific region in the FoV; this is similar to detecting the front of a car. In response, the perception engine 304 may determine to narrow the beam width for a more focused view of that sector or area in the FoV. The next scan may indicate the targets' length or other dimension, and if the target is a vehicle, the perception engine 304 may consider what direction the target is moving and focus the beams on that area. Similarly, the echo may be from a spurious target, such as a bird, which is small and moving quickly out of the path of the vehicle. The database 352 coupled to the perception engine 304 can store useful data for radar system 300, such as, for example, information on which subarrays of the transmit antennas 308-309 perform better under different conditions.

In various examples described herein, the use of radar system 300 in an autonomous driving vehicle provides a reliable way to detect targets in difficult weather conditions. For example, historically a driver will slow down dramatically in thick fog, as the driving speed decreases along with decreases in visibility. On a highway in Europe, for example, where the speed limit is 515 km/h, a driver may need to slow down to 50 km/h when visibility is poor. Using the radar system 300, the driver (or driverless vehicle) may maintain the maximum safe speed without regard to the weather conditions. Even if other drivers slow down, a vehicle enabled with the radar system 300 can detect those slow-moving vehicles and obstacles in its path and avoid/navigate around them.

Additionally, in highly congested areas, it is necessary for an autonomous vehicle to detect targets in sufficient time to react and take action. The examples provided herein for a radar system increase the sweep time of a radar signal to detect any echoes in time to react. In rural areas and other areas with few obstacles during travel, the perception engine 304 adjusts the focus of the RF beam to a larger beam width, thereby enabling a faster scan of areas where there are few echoes. The perception engine 304 may detect this situation by evaluating the number of echoes received within a given time period and making beam size adjustments accordingly. Once a target is detected, the perception engine 304 determines how to adjust the beam focus.

Figure 4:
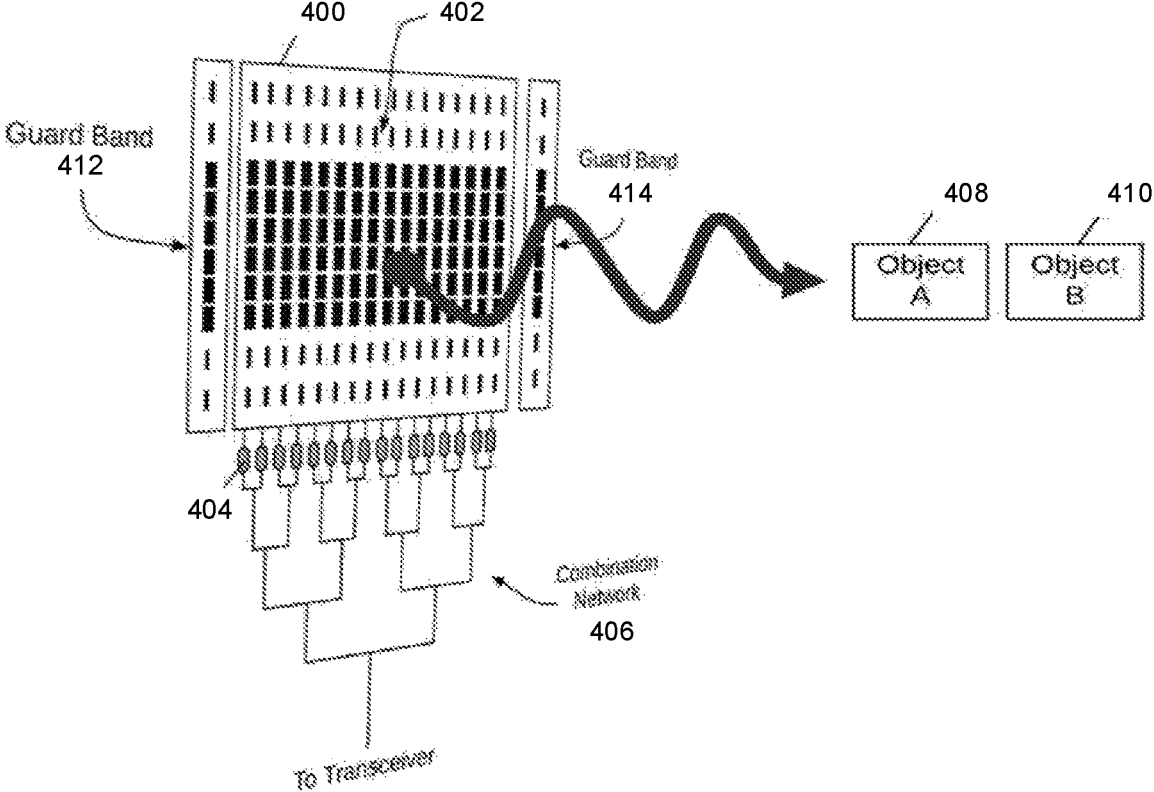
FIG. 4 illustrates a schematic diagram of guard band antennas along a receive antenna in more detail and in accordance with one or more implementations of the subject technology.

Attention is now directed to FIG. 4, which illustrates the receive guard band antennas as in FIG. 3 in more detail. Receive antenna 400 has a number of radiating elements 402 creating receive paths for signals or reflections from an object at a slightly different time. The radiating elements 402 may be meta-structures in some implementations, or patches in other implementations, in an array configuration such as in a 48-element antenna. The phase and amplification modules 404 provide phase shifting to align the received RF signals. The radiating elements 402 are coupled to the combination structure 406 and to phase and amplification modules 404, including phase shifters and LNAs implemented as PS circuits 320 and 322 and LNAs 341 and 342 of FIG. 3. In the present illustration, two objects, object A 408 and object B 410, are located at a same range and are moving at a same velocity with respect to the receive antenna 400. When the angular distance between the objects (e.g., 408 and 410) is lesser than the bandwidth of a radiation beam, the objects may be indistinguishable by the receive antenna 400. This is referred to as angular resolution or spatial resolution. In the radar and object detection fields, the angular resolution describes the radar's ability to distinguish between objects positioned proximate each other, in which the proximate location is generally measured by the range from an object detection mechanism, such as a radar antenna, to the objects and the velocity of the objects.

Radar angular resolution is the minimum distance between two equally large targets at the same range which the radar can distinguish and separate spatially. The angular resolution is a function of the antenna's half-power beam width, referred to as the 3 dB beam width and serves as a limiting factor to object differentiation. Distinguishing objects is based on accurately identifying the angle of arrival of reflections from the objects. Smaller beam width angles result in high directivity and more refined angular resolution but requires faster scanning to achieve the smaller step sizes. For example, in autonomous vehicle applications, the radar is tasked with scanning an environment of the vehicle within a sufficient time period for the vehicle to take corrective action when needed. This limits the capability of a system to specific steps. This means that any object having a distance therebetween less than the 3 dB angle beam width cannot be distinguished without additional processing. In other words, two identical targets at the same distance can be resolved in angle if they are separated by more than the antenna 3 dB beam width. The present examples use the multiple guard band antennas 311 and 314 to distinguish between the objects in the event that the monopulse module cannot resolve the objects at such angular distance.

Figure 5:
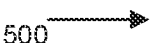
FIG. 5 is a flowchart to assist in the identification of objects by a beam steering radar in accordance with various implementations of the subject technology.

As illustrated in FIG. 4, for the antenna 400 to distinguish objects 408-410, the angular resolution of the objects must be less than the 3 dB beam width of the main lobes of a beam generated by receive paths 220. To assist in the identification of the objects a process 500 as in FIG. 5 employs the guard bands 412-414 to generate a guard band radiation beam in relation to a main beam. A object reflection is received at a main beam, 502, indicating there is an object detected. The process then determines if the guard band radiation beam also detected this object, 504, and if so, it captures the object. If the guard band radiation beam does not detect a reflection, 504, then processing in the monopulse module 357 initiates a search for multiple objects in the main beam, 506. The process determines a scan type, 508, and may reduce the scan steps of a main lobe or of the guard band radiation beam to determine if objects are detected, 510. If objects are detected, the process then captures the object data 512, else processing returns to receive reflections from objects 502.

Figure 6:
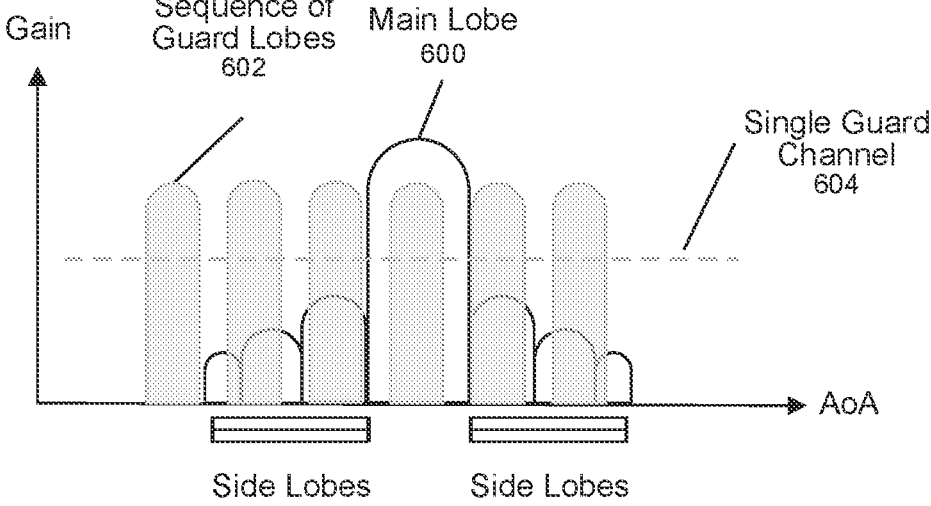
FIGS. 6-7 are graphs of main lobes and guard lobes, according to various examples.
Figure 7:
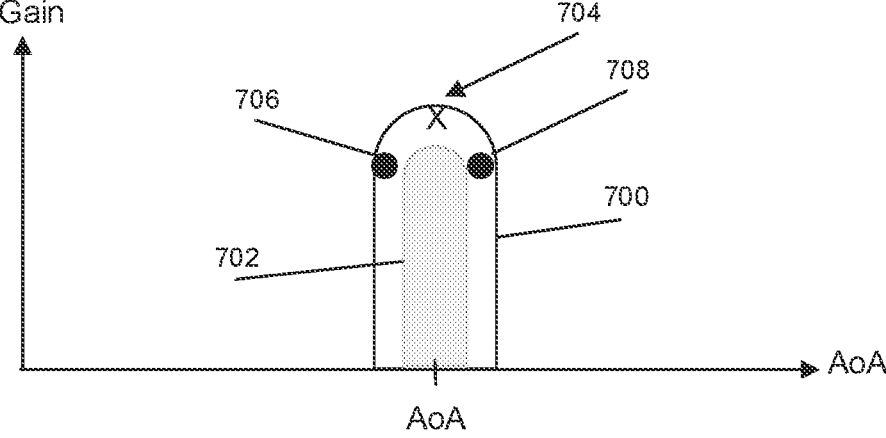

FIGS. 6-7 illustrate the relation of these signals, where a main lobe 600 results from the main radiating elements of the antenna structure, such as elements 402 of FIG. 4. The main lobe 600 has side lobes as illustrated by a plot of gain versus angle of arrival in FIG. 6. In addition to and separate from the main lobe 600 is a sequence of guard lobes 602.

These are used to filter signals above a gain level of a single guard channel 604. Using two guard band antennas (e.g., guard band antennas 412-414 of FIG. 4) results in the guard band radiation beam 602. Note that although two guard band antennas are illustrated, various configurations of beam steering radar 300 can include any number of guard band antennas. For example, a single guard band antenna can be incorporated in the beam steering radar, or more than two guard band antennas can be used. The more guard band antennas are implemented, the farther apart the lobes in the guard band antenna radiation beam are and the better the angular resolution.

FIG. 7 illustrates a main lobe 700 and a concurrent guard lobe 702. In this situation, two objects have an angular resolution less than a single main lobe 3 dB band width and are therefore effectively undistinguishable without the present example, wherein the radar would read the objects to be a single object located at location X 704 corresponding to the AoA. The objects are actually located at positions 706 and 704. As the radar identifies location 704, the present example evaluates the guard lobes to identify the object at this AoA. If the object is not detected by the guard band at AoA, then the radar is instructed to look for multiple objects. This may involve refining the scan of a main lobe or may involve digitally steering of a guard lobe within the main lobe.

These various examples of a beam steering radar support autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The radar described here is effectively a "digital eye," having true 3D vision and capable of human-like interpretation of the world.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A beam steering vehicle radar for object identification, comprising:

a beam steering receive antenna having a plurality of antenna elements to generate a radiation beam comprising a main lobe and a plurality of side lobes;

at least one guard band antenna to generate a guard band radiation beam; and a perception module coupled to the beam steering receive antenna to detect and identify a first object reflection in the radiation beam, wherein the perception module comprises a monopulse module to determine a range and angle of arrival for the first object reflection and detect multiple objects upon determining an absence of a second object reflection in the guard band radiation beam, and wherein, in response to detecting an object based on the radiation beam and absence of detecting the object in the guard band radiation beam, the perception module is configured to reduce the scan step size of the main lobe or guard band radiation beam within a localized angular region to identify multiple objects, wherein the guard band radiation beam has a 3 dB beamwidth less than that of the main lobe.

2. The beam steering vehicle radar of claim 1, wherein the beam steering receive antenna comprises a meta-structure antenna.

3. The beam steering vehicle radar of claim 1, wherein the beam steering receive antenna comprises a phased array antenna.

4. The beam steering vehicle radar of claim 1, wherein the beam steering receive antenna is controlled by the perception module.

5. The beam steering vehicle radar of claim 1, wherein perception module comprises to identify the multiple objects.

6. The beam steering vehicle radar of claim 1, wherein the monopulse module is to reduce the scan step size of the main lobe to detect the multiple objects.

7. The beam steering vehicle radar of claim 1, wherein the monopulse module is to reduce the scan step size of the guard band radiation beam to detect the multiple objects.

8. A method for identifying an object with a beam steering radar, comprising:

receiving a first object reflection in a main lobe from a receive antenna in the beam steering radar;

generating a guard band radiation beam from at least one guard band antenna;

determining a range and angle of arrival for the first object reflection;

capturing object data for the first object reflection upon determining a second object reflection in the guard band radiation beam at the angle of arrival; and initiating a refined scan to identify multiple objects upon determining an absence of other object reflections in the guard band radiation beam, wherein, in response to detecting an object based on the radiation beam and absence of detecting the object in the guard band radiation beam, the refined scan comprises reducing the scan step size of the main lobe or the guard band radiation beam within a localized angular region to identify multiple objects, wherein the guard band radiation beam has a 3 dB beamwidth less than that of the main lobe.

9. The method of claim 8, wherein receiving the first object reflection comprises receiving a millimeter wave RF signal at the receiving antenna.

10. The method of claim 8, wherein determining the range and the angle of arrival for the first object reflection comprises generating a range doppler map.

11. The method of claim 10, wherein capturing the object data for the first object reflection comprises identifying the first object reflection in the range doppler map using at least the one neural network.

12. The method of claim 8, wherein initiating the refined scan comprises reducing the scan step size of the main lobe to detect the multiple objects.

13. The method of claim 8, wherein initiating the refined scan comprises reducing the scan step size of the guard band radiation beam to detect the multiple objects.

14. A receive antenna system coupled to a processing engine in a beam steering radar, comprising:

a beam steering receive antenna having a plurality of antenna elements to receive a millimeter wave RF signal and generate a radiation beam comprising a main lobe and a plurality of side lobes; and at least one guard band antenna to generate a guard band radiation beam from the millimeter wave RF signal, wherein the processing engine is configured to detect multiple objects upon determining a first object reflection in the main lobe and an absence of a second object reflection in the guard band radiation beam, and wherein, in response to detecting an object based on the radiation beam and absence of detecting the object in the guard band radiation beam, the processing engine is configured to apply a different steering angle or reduce the scan step size of the main lobe or the guard band radiation beam within a localized angular region to identify multiple objects, wherein the guard band radiation beam has a 3 dB beamwidth less than that of the main lobe.

15. The receive antenna system of claim 14, wherein the beam steering receive antenna comprises a meta-structure antenna.

16. The receive antenna system of claim 14, wherein the processing engine comprises a perception module to control scan parameters of the beam steering receive antenna.

17. The receive antenna system of claim 16, wherein the perception module comprises to identify the multiple objects.

18. The receive antenna system of claim 14, wherein the processing engine is to reduce the scan step size of the main lobe to detect the multiple objects.

19. The receiving antenna system of claim 14, wherein the processing engine is to reduce the scan step of the guard band radiation beam to detect the multiple objects.

20. The receive antenna system of claim 14, wherein the beam steering receive antenna is coupled to a plurality of phase shifters to align received millimeter wave RF signals that arrive at different times at each of the plurality of antenna elements in the beam steering receive antenna.

* * * * *